United States Patent
Singh et al.

(10) Patent No.: US 10,734,664 B1
(45) Date of Patent: Aug. 4, 2020

(54) PURIFIED HYDROGEN BIS(FLUOROSULFONYL)IMIDE (HFSI) PRODUCTS, METHODS OF PURIFYING CRUDE HFSI, AND USES OF PURIFIED HFSI PRODUCTS

(71) Applicant: SES Holdings Pte. Ltd., Singapore (SG)

(72) Inventors: Rajendra P. Singh, Woburn, MA (US); Qichao Hu, Arlington, MA (US)

(73) Assignee: SES Holdings Pte. Ltd., Singapore (SG)

( * ) Notice: Subject to any disclaimer, the term of this patent is extended or adjusted under 35 U.S.C. 154(b) by 0 days.

(21) Appl. No.: 16/570,131

(22) Filed: Sep. 13, 2019

Related U.S. Application Data (60) Provisional application No. 62/812,371, filed on Mar. 1, 2019, provisional application No. 62/832,968, filed on Apr. 12, 2019.

(51) Int. Cl.

| | |
|---|---|
| *H01M 8/103* | (2016.01) |
| *C01B 21/088* | (2006.01) |
| *H01M 10/0525* | (2010.01) |
| *C08L 79/08* | (2006.01) |
| *H01M 10/0565* | (2010.01) |

(52) U.S. Cl.
CPC .......... *H01M 8/103* (2013.01); *C01B 21/088* (2013.01); *C08L 79/08* (2013.01); *H01M 10/0525* (2013.01); *H01M 10/0565* (2013.01); *C08L 2203/20* (2013.01)

(58) Field of Classification Search
CPC .................................................. C01B 21/086
See application file for complete search history.

(56) References Cited

U.S. PATENT DOCUMENTS

| 8,377,406 B1 | 2/2013 | Singh et al. |
| 8,580,220 B2 | 11/2013 | Honda et al. |
| 8,722,005 B1 | 5/2014 | Poshusta et al. |

(Continued)

FOREIGN PATENT DOCUMENTS

| WO | 2018157240 A1 | 9/2018 |

OTHER PUBLICATIONS

Rolf Appel, Gerhard Eisenhauer, Chemische Berichte, 1962, pp. 246-248.

(Continued)

*Primary Examiner* — Wayne A Langel
(74) *Attorney, Agent, or Firm* — Downs Rachlin Martin PLLC (57) ABSTRACT

A method of removing one or more target impurities from crude hydrogen bis(fluorosulfonyl)imide (HFSI) using a crystallization technique. In some embodiments, the method includes contacting the crude HFSI with at least one anhydrous solvent to create a solution. The solution is caused to have a temperature sufficient to cause HFSI in the solution to crystalize while the one or more impurities remain dissolved in the mother liquor of the solution. The crystalized HFSI and the mother liquor containing the one or more impurities are separated to obtained a purified HFSI product. Purified HFSI products are also disclosed, as are systems, such as secondary batteries, incorporating purified HFSI products.

30 Claims, 2 Drawing Sheets

(56) References Cited

U.S. PATENT DOCUMENTS

| | | | |
|---|---|---|---|
| 8,815,199 B2* | 8/2014 | Morinaka | B01J 31/0252 |
| | | | 423/300 |
| 2018/0362343 A1* | 12/2018 | Hormes | C01B 21/086 |
| 2018/0370799 A1* | 12/2018 | Lim | C07C 311/48 |
| 2019/0276311 A1* | 9/2019 | Itayama | C07C 303/00 |
| 2019/0292053 A1* | 9/2019 | Schmidt | C01B 21/086 |
| 2019/0292054 A1* | 9/2019 | Okumura | H01M 10/0569 |

OTHER PUBLICATIONS

John K. Ruff and Max Lustig; Inorganic Syntheses, 1967, vol. 11, pp. 138-143.

B. Krumm, A. Vij, R.L. Kirchmeier, J. M. Shreeve, Inorganic Chemistry, 1998, 37, pp. 6295-6303.

Martin Beran, Jiri Prihoda, Zdirad Zak, Milos Cernik, Polyhedron, 2006, 25, pp. 1292-1298.

Martin Beran and Jiri Prihoda; A New Method of the Preparation of Imido-bis(sulfuric acid) Dihalogenide, (F,Cl), and the Potassium Salt of Imido-bis(sulfuric acid) Difluoride; Z. Anorg. Allg. Chem. 2005, 631, pp. 55-59.

* cited by examiner

PURIFIED HYDROGEN BIS(FLUOROSULFONYL)IMIDE (HFSI) PRODUCTS, METHODS OF PURIFYING CRUDE HFSI, AND USES OF PURIFIED HFSI PRODUCTS

RELATED APPLICATION DATA

This application claims the benefit of priority of U.S. Provisional Patent Application Ser. No. 62/812,371, filed Mar. 1, 2019, and titled "PROCESS FOR PURIFICATION OF HYDROGEN BIS(FLUOROSULFONYL)IMIDE (HFSI)" and of U.S. Provisional Patent Application Ser. No. 62/832,968, filed Apr. 12, 2019, and titled "PROCESS FOR PURIFICATION OF HYDROGEN BIS(FLUOROSULFO-NYL)IMIDE (HFSI)", each of which is incorporated by reference herein in its entirety.

FIELD OF THE INVENTION

The present invention generally relates to the field of hydrogen bis(fluorosulfonyl)imide (HFSI). In particular, the present invention is directed to purified HFSI products, methods of purifying crude HFSI, and uses of purified HFSI products.

BACKGROUND

Hydrogen bis(fluorosulfonyl)imide (HFSI) may be used in synthesizing any of a variety of compounds, including alkali-metal bis(fluorosulfonyl)imide (FSI) salts, such as lithium FSI (LiFSI), sodium FSI (NaFSI), and potassium FSI (KFSI), among others. Typically, synthesis of alkali-metal FSI salts starts with obtaining or synthesizing a crude HFSI. Examples of methods of synthesizing HFSI include reacting $ClSO_2NHSO_2Cl$ with a fluorinating agent, such as $AsF_3$, $SbF_3$, $BiF_3$, or anhydrous HF, under conditions sufficient to synthesize the HFSI or reacting fluorosulfonic acid with urea under conditions sufficient to synthesize the HFSI. However, the HFSI so synthesized may be considered "crude HFSI", because the HFSI in the reaction product is contaminated with various impurities, such as fluorosulfonic acid ($FSO_3H$), hydrochloric acid (HCl), hydrogen fluoride (HF), and sulfuric acid ($H_2SO_4$), that are byproducts of the corresponding reaction.

When crude HFSI is used to synthesize alkali-metal FSI salts, the impurities from the synthesis of HFSI result in impurities with the alkali-metal FSI salts. Using LiFSI as an example, when LiFSI is synthesized by neutralizing crude HFSI, impurities such as the HF, $FSO_3H$, HCl, and $H_2SO_4$ are converted into the corresponding lithium salt to produce LiF, $FSO_3Li$, LiCl, and $Li_2SO_4$. Depending on the desired use of an alkali-metal FSI salt synthesized from crude HFSI, the impurities resulting from the impurities in the crude HFSI can be detrimental to that use.

Again using LiFSI as an example, LiFSI salt may be used in electrolytes for lithium-ion batteries due to it having desirable properties for that use. Examples of these desirable properties include, but are not limited to, far superior stability compared to $LiPF_6$ (a common electrolyte salt for lithium-ion batteries), excellent solubility, ionic conductivity similar to $LiPF_6$, cost-effectiveness, environmental benignity, and ability to form a favorable solid electrolyte interface (SEI). However, the impurities, for example, LiF, $FSO_3Li$, LiCl, and $Li_2SO_4$, in the LiFSI salt products resulting from impurities, for example, HF, $FSO_3H$, HCl, and $H_2SO_4$, in the underlying crude HFSI can have undesirable effects on the operation and life of lithium-ion batteries if their levels are not below certain upper limits. Consequently, it would be desirable to be able to reliably remove impurities, such as the synthesis impurities noted above, from crude HFSI prior to using the HFSI to synthesize LiFSI, another alkali-metal FSI, or other composition.

SUMMARY OF THE DISCLOSURE

In an implementation, the present disclosure is directed to a method of removing one or more target impurities from crude hydrogen bis(fluorosulfonyl)imide (HFSI) containing HFSI and the one or more target impurities so as to create a purified HFSI product. The method includes contacting the crude HFSI with at least one anhydrous organic solvent under inert conditions to create a solution containing the crude HFSI and the one or more target impurities; causing the solution to have a temperature sufficient to cause the HFSI in the solution to crystallize while the one or more target impurities remain dissolved in a mother liquor of the solution; and separating the crystallized HFSI from the mother liquor containing the one or more dissolved target impurities.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In some aspects, the present disclosure is directed to methods of purifying crude hydrogen bis(fluorosulfonyl) imide (HFSI) to remove any one or more of various impurities from the crude HFSI. As used herein and in the appended claims, the term "crude HFSI" and like terms indicate a synthesis product that contains HFSI and one or more impurities, such as impurities resulting from the synthesis of the HFSI. Hereinafter and in the appended claims, this type of impurity is referred to as a "synthesis impurity." Each of the impurities targeted to be removed to one extent or another using the disclosed methods is referred to herein and in the appended claims as a "target impurity". In an example, a target impurity can be a synthesis impurity that is a byproduct of the synthesis of the HFSI as noted above.

As used herein and in the appended claims, the term "anhydrous" refers to having about 1% by weight of water or less, typically about 0.5% by weight of water or less, often about 0.1% by weight of water or less, more often about 0.01% by weight of water or less, and most often about 0.001% by weight of water or less. Within this definition, the term "substantially anhydrous" refers to having about 0.1% by weight of water or less, typically about 0.01% by weight of water or less, and often about 0.001% by weight of water or less.

Throughout the present disclosure, the term "about" when used with a corresponding numeric value refers to ±20% of the numeric value, typically ±10% of the numeric value, often ±5% of the numeric value, and most often ±2% of the numeric value. In some embodiments, the term "about" means the numeric value itself.

As described in the Background section above, example methods of synthesizing HFSI include reacting $ClSO_2NHSO_2Cl$ with a fluorinating agent, such as $AsF_3$, $SbF_3$, $BiF_3$, or anhydrous HF, under conditions sufficient to synthesize the HFSI or be reacting fluorosulfonic acid with urea under conditions sufficient to synthesize the HFSI. However, the HFSI so synthesized may be considered "crude HFSI", because it is contaminated with various synthesis impurities, such as, fluorosulfonic acid ($FSO_3H$), hydrochloric acid (HCl), hydrogen fluoride (HF), and sulfuric acid ($H_2SO_4$), that are byproducts of the corresponding synthesis reaction. In some embodiments, purification methods of the present disclosure remove one or more synthesis impurities, such as one or more of HF, $FSO_3H$, HCl, HBr, and $H_2SO_4$, and/or any other impurity having a molecular structure and properties amenable for removal by the disclosed methods, each of which is a "target impurity" in the parlance of this disclosure.

In another aspect, the present disclosure is directed to a purified HFSI product containing HFSI and a relatively low level of one or more target impurities, such as one or more synthesis impurities, for example, HF, $FSO_3H$, HCl, and $H_2SO_4$ as noted above. As described in more detail below, such purified HFSI product may be made using a purification method of the present disclosure that can generate the purified HFSI product in a single pass through one of the disclosed basic process or in multiple passes through one or more of the disclosed basic processes.

In yet another aspect, the present disclosure is directed to methods of synthesizing an alkali-metal FSI salt product using a purification process of the present disclosure. Examples of alkali-metal salt products that can be made in accordance with the present disclosure include, lithium FSI (LiFSI), sodium FSI (NaFSI), and potassium FSI (KFSI), among others.

In a further aspect, the present disclosure is directed to alkali-metal FSI salt products containing the desired alkali-metal FSI salt and a relatively low level of one or more target impurities. Such target impurity(ies) may be one or more impurities based on synthesis impurities from the synthesis of the HFSI used to make the alkali-metal HFSI salt, for example, alkali-metal salts resulting from transformation of HF, $FSO_3H$, HCl, and/or $H_2SO_4$ that may be present in crude HFSI used to make the alkali-metal FSI salt products. Examples of such alkali-metal salt impurities include, but are not limited to, LiF, $FSO_3Li$, LiCl, and $Li_2SO_4$.

In still a further aspect, the present disclosure is directed to uses of alkali-metal FSI salt products of the present disclosure. For example, alkali-metal FSI salts products of the present disclosure can be used to make electrolytes that can be used in any suitable electrochemical device, such as a battery or supercapacitor. Electrolytes made using a relatively low impurity alkali-metal FSI salt of the present disclosure will have correspondingly low levels of impurities, such as impurities that would otherwise result from synthesis impurities from the synthesis of the HFSI used to make the alkali-metal FSI salt.

Details of the foregoing and other aspects of the present disclosure are described below.

Example Methods of Purifying Crude HFSI

While many processes for producing HFSI are known, each of the known methods for synthesizing HFSI produces crude HFSI containing various levels of impurities, such as synthesis impurities. For example, one method of synthesizing HFSI uses urea ($NH_2CONH_2$) and fluorosulfonic acid ($FSO_3H$). Disadvantages of this process are low yield of HFSI and the isolated HFSI having a large excess of fluorosulfonic acid as an impurity. Since the boiling point (b.p.) of fluorosulfonic acid (b.p. 165.5° C.) and the b.p. of HFSI (b.p. 170° C.) are very close to one another, it is very difficult to separate them from one another by simple fractional distillation [1]. An attempt to remove fluorosulfonic acid has been made by treating a mixture of HFSI and fluorsulfonic acid with sodium chloride where sodium chloride selectively reacts with fluorosulfonic acid to make sodium salts and HCl byproducts. This process has suffered from low yield of purified HFSI, and the HFSI product was also contaminated with some chloride impurities (HCl and NaCl) as impurities.

Another method of synthesizing HFSI involves fluorinating bis(chlorosulfonyl)imide (HCSI) with arsenic trifluoride ($AsF_3$). In this reaction, HCSI is treated with $AsF_3$. Arsenic trifluoride is toxic, and because it has a high vapor pressure, it is particularly difficult to handle on an industrial scale. A typical reaction uses 1:8.6 ratio of HCSI to $AsF_3$. HFSI produced by this method was also found to be contaminated with $AsF_3$ and $AsCl_3$ synthesis impurities, which were found to be a good source of chloride and fluoride impurities [2].

HFSI can also be prepared by fluorinating HCSI with antimony trifluoride ($SbF_3$). The antimony trichloride byproduct of this reaction has both high solubility in HFSI and is sublimatable in nature; it is very difficult to separate from the desired product. The product of this reaction is typically contaminated with antimony trichloride, which is a good source of chloride impurities [3].

Yet another method for producing HFSI involves reacting HCSI with excess anhydrous HF at high temperature [4]. The yield of this reaction is at most 60%, with the product contaminated with fluorosulfonic acid that is produced from the decomposition of HCSI. This by-product is difficult to remove, as the boiling point is close to the boiling point of HFSI. This reaction using anhydrous HF to fluorinate HSCI has achieved >95% yield [5], but still the product is contaminated with fluorosulfonic acid, hydrogen fluoride, hydrogen chloride, and sulfuric acid as synthesis impurities.

Reacting HCSI with bismuth trifluoride ($BiF_3$) has been reported to yield HFSI in a cleaner reaction product. In this reaction, $BiCl_3$ byproduct that is formed can be easily separated from HFSI by fractional distillation, since $BiCl_3$ is not sublimatable [6]. Still, however, the product has some chloride, fluoride, and fluorosulfonic acid as synthesis impurities.

In another method of synthesizing HFSI, potassium bis (fluorosulfonyl)imide (KFSI) is reacted with perchloric acid [7]. In this process, the byproduct potassium perchlorate is considered to be explosive. Also, the isolated HFSI is contaminated with high level of potassium cations and some chloride impurities that are present in KFSI.

Hydrogen bis(fluorosulfonic acid) also known as Imido-bis(sulfuric acid) difluoride having the formula, $FSO_2NH$—$O_2F$, is a colorless liquid having a melting point (m.p.) of 17° C., a b.p. of 170° C., and a density 1.892 g/cm³. It is very well soluble in water and in a number of organic solvents. Hydrolysis in water is relatively slow and leads to the formation of HF, $H_2SO_4$, and amidosulfuric acid ($H_3NSO_3$). HFSI is a strong acid, with a pKa of 1.28 [8].

A purification method of the present disclosure can be used to remove target impurities, such as synthesis impurities and/or other impurities, present in crude HFSI, for example, a crude HFSI synthesized using any one or more of the foregoing synthesis methods. In some embodiments, the method includes contacting crude HFSI with at least one anhydrous organic solvent under inert conditions to create a solution containing the crude HFSI and the one or more target impurities. The inert conditions may be created using any suitable technique, such as by using nitrogen and/or argon gas, among others.

The solution is caused to have a temperature sufficient to cause HFSI in the solution to crystalize while the one or more target impurities remain dissolved in a mother liquor of the solution. In an example, the temperature is caused to be at a temperature lower than 17° C., which is the melting point of HFSI. In an example, the temperature of the solution is caused to be in a range of less than 17° C. to about −83° C. In an example, the temperature of the solution is caused to be about 15° C. to about −20° C. In an example, the temperature of the solution is caused to be in a range of about 5° C. to about −20° C. In an example, the temperature of the solution is caused to be in a range of about 10° C. to about −10° C. The solution may be caused to have the sufficient temperature in any of a variety of ways, such as a jacketed flask having a cooling system, as is known in the art. In an example, the amount of the one or more anhydrous organic solvents in the solution may be in a range of about 15% by weight to about 50% by weight relative to the solution. In some embodiments, increasing weight percentages of solvent increases the extent of removal of the target impurity(ies) but lowers the yield of HFSI.

After the HFSI has crystallized, the crystalized HFSI may be separated from the mother liquor containing the one or more target impurities to isolate the crystalized HFSI. This separation may be performed using any suitable technique, such as mechanical filtration, gravity separation, hydrocycloning, flushing with dry nitrogen gas while the solution is cold, or any other suitable technique, or any combination thereof. After the crystalized HFSI has been isolated from the mother liquor, it may additionally be washed using one or more suitable anhydrous organic solvents at a temperature below the melting point of the HFSI. In an example, the crystalized HFSI may be washed using at least one anhydrous organic solvent having a temperature of about 10° C. or less. In an example, the crystalized HFSI may be washed using at least one anhydrous organic solvent having a temperature of about 5° C. to about −20° C. In some embodiments, the washed crystalized HFSI may be flushed with dry nitrogen gas to remove traces of solvent that may remain on the washed crystallized HFSI. The dried crystalized HFSI may be stored in a dry inert container, such as a dry polytetrafluoroethylene container that is inert to free fluoride, and at a reduced temperature, such as about 25° C. or below, to inhibit degradation of the HFSI during storage.

In some embodiments, each of the anhydrous organic solvents, either for forming the solution or for washing the crystalized HFSI, or both, may be selected from the group consisting of dichloromethane, chloroform, dichloroethane, dimethyl carbonate (DMC), diethyl carbonate (DEC), ethyl methyl carbonate (EMC), propyl methyl carbonate (PMC), fluoroethylene carbonate (FEC), trans butylene carbonate, acetonitrile, malononitrile, adiponitrile, methyl acetate, ethyl acetate, propyl acetate, butyl acetate, methyl propionate (MP), ethyl propionate (EP), methanol, ethanol, propanol, and isopropanol.

In some embodiments, the selected anhydrous organic solvent is dichloromethane. As an example, the following Table shows boiling points, melting points, and solubilities in dichloromethane of HFSI and several example target impurities, here, $FSO_3H$, HF, and HCl.

TABLE

| Compound | B.P. (° C.) | M.P. (° C.) | Soluble in Dichloromethane |
|---|---|---|---|
| $FSO_2NHSO_2F$ (HFSI) | 170 | 17 | Yes |
| $FSO_3H$ (fluorosulfonic acid) | 165 | −87.5 | Yes |
| HF (hydrogen fluoride) | 19.5 | −83.6 | Yes |
| HCl (hydrogen chloride) | −85.0 | −114.2 | Yes |

Based on the Table, above, it is seen that HFSI has a melting point of 17° C., a boiling point of 170° C., and is soluble in dichloromethane. The melting point of $FSO_3H$ is −87.5° C., and its boiling point is 165° C. It is also soluble in dichloromethane. HF has boiling point of 19.5° C. and a melting point of −83.6° C. HCl has boiling point of −85° C. and a melting point of −114.2° C. Both HF and HCl are soluble in dichloromethane. Dichloromethane has a boiling point of 39.6° C. and a melting point of −96.7° C. In accordance with the disclosed methodology, the target impurities reported in the Table were dissolved in dichloromethane in the temperature range of about 10° C. to about −20° C., while the HFSI having a melting point of 17° C. crystalizes. When the crystalized HFSI is separated carefully from the mother liquor, target impurities remain in the mother liquor due to their lower melting points. Therefore, the HFSI isolated in this manner is free from the target impurities remaining in the mother liquor. As noted above, one or more additional steps, such as washing with one or more anhydrous organic solvents, and/or removing any remaining solvent(s), may be performed.

While the foregoing illustration uses dichloromethane, one or more other suitable anhydrous organic solvents may be used. For example, each of the one or more anhydrous organic solvents used may be selected based on the ability to dissolve crude HFSI, including the HFSI and each target impurity, but also be controlled in temperature to cause the HFSI to crystalize while the target impurity(ies) remain dissolved in the mother liquor. Examples of suitable anhydrous organic solvents are listed above.

Depending on the concentration(s) of the target impurity(ies) in the crude HFSI being purified using any one of the above methodologies and on the desired maximum concentration(s) of one or more of those target impurities in a purified HFSI product, it may be desirable to perform a multi-pass method to sequentially reduce the amount(s) of the one or more target impurities with each pass. Such a multi-pass method may utilize any one or more of the foregoing methodologies in series to continually reduce the level of each of one or more target impurities initially in the crude HFSI and then that may still be remaining in the resulting purified HFSI product. An example multi-pass purification method 100 of the present disclosure is illustrated in FIG. 1.

Figure 1:
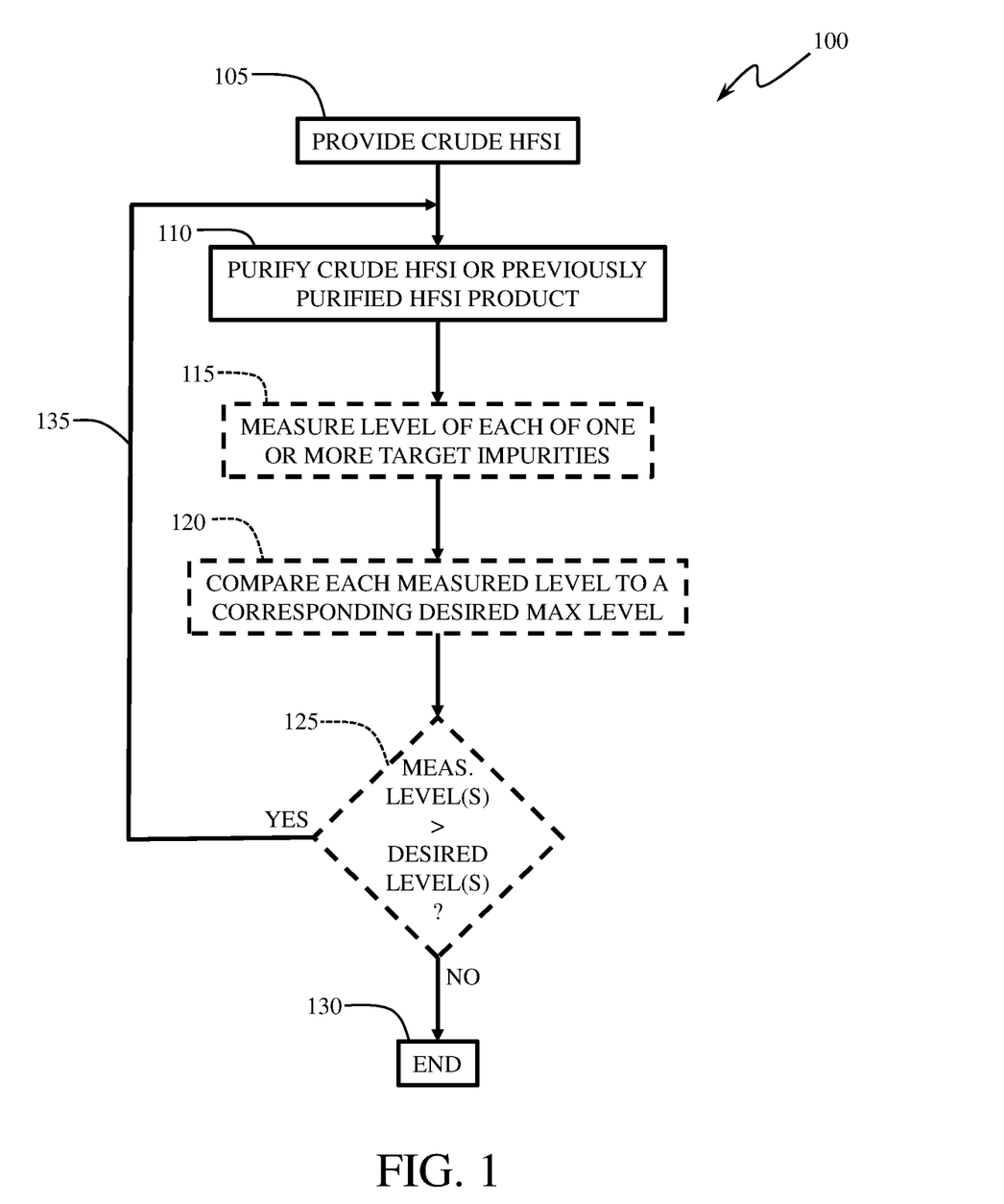
FIG. 1 is a flow diagram illustrating a multi-pass method of purifying hydrogen bis(fluorosulfonyl)imide (HFSI) in accordance with aspects of the present disclosure.

Referring to FIG. 1, at block 105, a crude HFSI containing one or more target impurities present at certain levels is provided. At block 110, the crude HFSI is purified using any one of the methodologies described above that includes making a solution by adding one or more anhydrous organic solvents to the crude HFSI. An end result of the purification at block 110 is a purified HFSI product in which the level of each target impurity has been reduced. At optional block 115, the level of each of one or more of the target impurities in the purified HFSI product is measured using a suitable measurement procedure. At optional block 120, each of the measured levels is compared to a maximum desired level for the corresponding target impurity that is acceptable to be in the purified HFSI product. At optional block 125, it is determined whether any one or more of the measured levels exceeds the corresponding desired maximum level. If not, i.e., if each measured level is below the corresponding desired maximum level, then the purified HFSI product meets the desired impurity-level specification and does not need further purification. Therefore, the multi-pass purification method 100 can end at block 130.

However, if at block 125 any one or more of the measured levels exceeds the corresponding desired maximum level(s), then the purified HFSI product purified in the previous pass through purification at block 110 may be purified at block 110 via a loop. In this pass through purification at block 110, the anhydrous organic solvent(s) used for making the solution and/or washing the crystalized HFSI may be the same or different as used in the previous pass through purification at block 110. At the end of purification at block 110, at optional blocks 115 and 120 one or more measurements of the target impurity level(s) and one or more comparisons of the measured level(s) to one or more corresponding desired maximum levels can be made to determine whether the method 100 can end at block 130 or the HFSI in the purified HFSI product of the most recent pass should be subjected to purification again via the loop 135.

A nonlimiting but illustrative example of where a multi-pass purification method could be useful is for a lithium-based electrolyte, such as LiFSI, for a lithium-based battery. LiFSI made using crude HFSI would typically have chloride impurities, such as from HCl synthesis impurities, on the order of 150 ppm or more. However, such chloride levels are corrosive to lithium-metal batteries. Consequently, it is desired to keep chloride levels in LiFSI-based electrolytes for lithium-metal batteries low, such as less than about 10 ppm or less than 1 ppm. Using a multi-pass purification methodology of the present disclosure, such as the multi-pass purification method 100 illustrated in FIG. 1, for crude HFSI used to synthesize the LiFSI salt used in the electrolyte may be a useful way of achieving such low chloride levels.

As a non-limiting but illustrative example, multi-pass purification method 100 may be used to lower the chlorine (in the form of target impurity HCl) content in an HFSI product to below 1 ppm, starting with crude HFSI containing 200 ppm of HCl as a synthesis impurity. At block 105, a desired amount of the crude HFSI is provided. At block 110, the crude HFSI is purified using any of the purification methodologies described above, which includes making a solution comprising the crude HFSI and one or more suitable anhydrous organic solvents, causing the HFSI to crystallize, and separating the crystalized HFSI from the mother liquor containing some amount of the HCl impurities from the original crude HFSI, among other purification steps, to create a purified HFSI product.

At optional block 115, the level of HCl (or chlorides) in the purified HFSI product are measured to be 100 ppm. At optional block 120, the measured level of 100 ppm is compared against the less-than-1 ppm requirement. At optional block 125, since 100 ppm is greater than the less-than-1 ppm requirement, the purified HFSI product is processed at block 110, via loop 135, using the same or differing purification process as used to purify the initial crude HFSI. In this second pass, the starting target impurity level is 100 ppm, and the ending impurity level in the twice-purified HFSI product is now 20 ppm, as measured at optional block 115. After comparing this 20 ppm level to the less-than-1 ppm requirement at optional block 120, at optional block 125 it is determined that the twice-purified HFSI product needs to be purified again at block 110, via loop 135, with the same or different purification method used in either of the two prior passes.

In this third pass, the starting target impurity level is 20 ppm, and the ending impurity level in the thrice-purified HFSI product is now less than 1 ppm, as measured at optional block 115. After comparing this less-than-one ppm level to the less-than-1 ppm requirement at optional block 120, at optional block 125 it is determined that the thrice-purified HFSI product satisfies the requirement such that multi-pass purification method 100 can end at block 130.

EXAMPLES

The above methodologies are further illustrated by the following examples, although it will be understood that these examples are included merely for purposes of illustration and are not intended to limit the scope of the present disclosure. Unless otherwise stated, all the chemicals used in these examples were of high purity and obtained from reputable commercial sources. Stringent precautions were taken to exclude moisture from the processes, and reactions were performed using well-ventilated hoods. In the following examples, crude HFSI was prepared by the reaction of $ClSO_2NHSO_2Cl$ (HCSI) with bismuth trifluoride according to procedures available in known literature. [6] In a typical experiment, HCSI (642 g, 3 mole) was taken in a three-neck flask and heated to 45° C. Anhydrous $BiF_3$ (618 g, 3.25 mole) was added portion-wise. After complete addition of $BiF_3$, the reaction mixture was heated to 70° C. for 1 hour. The HFSI was distilled as a crude product and was then spiked with various levels of impurities, such as $FSO_3H$, HF, HCL, and $H_2SO_4$, and used in the following examples of purification disclosed herein. HFSI is highly soluble in dichloromethane. Therefore, the yield and purity of HFSI depends on the amount of dichloromethane used in the purification process.

Example 1

In a 500 mL dry filtration funnel, crude HFSI (200 g) with various levels of target impurities, here, $FSO_3H$=1000 ppm, HCl=200 ppm, HF=500 ppm, and $H_2SO_4$=500 ppm, was dissolved in 50 g of anhydrous dichloromethane under dry nitrogen atmosphere, resulting in a 20%, by weight, solvent content for the solution. The filtration funnel was closed with a stopper and stored at 0° C. for 4 hours. Crystals of an HFSI product formed. The HFSI product was filtered under a dry nitrogen atmosphere and washed with 25 ml cold dichloromethane to get colorless crystals in 95% yield. The resulting washed crystalized HFSI product contained the following impurities: $FSO_3H$=550 ppm; HCl=100 ppm; HF=80 ppm; and $H_2SO_4$=500 ppm.

Example 2

In a 500 mL dry filtration funnel, crude HFSI (200 g) with various levels of target impurities, here, $FSO_3H$=1000 ppm, HCl=200 ppm, HF=500 ppm, and $H_2SO_4$=500 ppm, was dissolved in 75 g of anhydrous dichloromethane under dry nitrogen atmosphere, resulting in a 27%, by weight, solvent content for the solution. The filtration funnel was closed with a stopper and stored at 0° C. for 4 hours. Crystals of an HFSI product formed. The HFSI product was filtered under a dry nitrogen atmosphere and washed with 25 ml cold dichloromethane to get colorless crystals in 90% yield. The resulting washed crystalized HFSI product contained the following impurities: $FSO_3H$=300 ppm; HCl=80 ppm; HF=60 ppm; and $H_2SO_4$=400 ppm.

Example 3

In a 500 mL dry filtration funnel, crude HFSI (200 g) with various levels of target impurities, here, $FSO_3H$=1000 ppm, HCl=200 ppm, HF=500 ppm, and $H_2SO_4$=500 ppm, was dissolved in 100 g of anhydrous dichloromethane under dry nitrogen atmosphere, resulting in a 33%, by weight, solvent content for the solution. The filtration funnel was closed with a stopper and stored at 0° C. for 4 hours. Crystals of an HFSI product formed. The HFSI product was filtered under a dry nitrogen atmosphere and washed with 25 ml cold dichloromethane to get colorless crystals in 85% yield. The resulting washed crystalized HFSI product contained the following impurities: $FSO_3H$=215 ppm; HCl=50 ppm; HF=40 ppm; and $H_2SO_4$=280 ppm.

Example 4

In a 500 mL dry filtration funnel, crude HFSI (200 g) with various levels of target impurities, here, $FSO_3H$=1000 ppm, HCl=200 ppm, HF=500 ppm, and $H_2SO_4$=500 ppm, was dissolved in 150 g of anhydrous dichloromethane under dry nitrogen atmosphere, resulting in a 43%, by weight, solvent content for the solution. The filtration funnel was closed with a stopper and stored at 0° C. for 4 hours. Crystals of an HFSI product formed. The HFSI product was filtered under a dry nitrogen atmosphere and washed with 25 ml cold dichloromethane to get colorless crystals in 75% yield. The resulting washed crystalized HFSI product contained the following impurities: $FSO_3H$=150 ppm; HCl=20 ppm; HF=20 ppm; and $H_2SO_4$=100 ppm.

In each of the foregoing examples, all of the experimental parameters and variables were the same, except for the amount of anhydrous organic solvent used. The amount of anhydrous organic solvent used, and correspondingly the weight percentage of solvent in the solution, increased from Example 1 to Example 4. As can be seen by comparing the levels of the target impurities after washing the crystalized HFSI product and the corresponding HFSI product yields among the above four examples, as the amount of solvent used to make the initial solution increases, the amounts of target impurities removed increase but the HFSI product yields decrease. As an example, a single pass of solvent may give HFSI in around 90% yield, while a double pass may give HFSI in around 85% yield, with the double pass providing higher purity than the single pass.

Example Purified HFSI Products

Using any of the foregoing purification methodologies, such as any of the single-pass purification methodologies disclosed above or multi-pass methodology 100 of FIG. 1, the resulting purified HFSI products can have exceptionally low levels of target impurities removed by the purification method. For example, a purified HFSI product of the present disclosure in which at least one of the target impurities is Cl⁻ can have a Cl⁻ level not more than about 20 ppm, less than or equal to 10 ppm, or less than 1 ppm. As another example, a purified HFSI product of the present disclosure in which at least one of the target impurities includes F, $FSO_3^-$, and Cl⁻ can have: F⁻ less than or equal to about 100 ppm, $FSO_3^-$ less than or equal to about 400 ppm, and Cl⁻ less than about 20 ppm; F⁻ less than or equal to about 40 ppm, $FSO_3^-$ less than or equal to about 250 ppm, and Cl⁻ less than or equal to about 20 ppm; or F less than or equal to about 200 ppm, $FSO_3^-$ less than or equal to about 100 ppm, and HCl less than or equal to about 30 ppm. In another example, each of the foregoing levels of impurities and combinations thereof can be achieved starting with a crude HFSI having about 500 ppm or more of F⁻, about 1000 ppm or more of $FSO_3^-$, and/or about 200 ppm or more of Cl⁻. In yet another example, a purified HFSI product of the present disclosure in which at least one of the target impurities is $SO_4^{2-}$ can have an $SO_4^{2-}$ level less than or equal to about 200 ppm, or less than or equal to about 100 ppm. In a further example, each of the foregoing $SO_4^{2-}$ levels can be achieved starting with a crude HFSI having about 500 ppm or more of $SO_4^{2-}$. In still a further example, a purified HFSI product of the present disclosure may have the following impurities: F⁻<20 ppm, Cl⁻<2 ppm, $SO_4^{2-}$<20 ppm, and water <50 ppm.

Example Methods of Synthesizing a Purified Alkali-Metal FSI Product

As mentioned above, a purified HFSI product having reduced levels of one or more target impurities can be used to make a purified alkali-metal ($M_A$) FSI product having commensurately low levels of impurities that result from target impurities that may still be present within the purified HFSI product. Here, $M_A$ can be any one of lithium, sodium (Na), potassium (K), rubidium (Rb), caesium (Cs), and francium (Fr). Any one or more of these purified $M_A$FSI products may be used for any of a variety of purposes, such as to make an electrolyte for an electrochemical device, for example, a battery or a supercapacitor, among other things.

Using LiFSI as an example purified $M_A$FSI product that can be made in accordance with the present disclosure, a method of making such a purified LiFSI product may begin with obtaining crude HFSI from a suitable source or synthesizing crude HFSI, for example, using any one or more of the synthesis methodologies described above. The crude HFSI may then be purified using any one or more of the methods disclosed herein, including the single-pass and multi-pass methods described above in detail. Such method(s) can be used to reduce the level(s) of one or more target impurities, including any synthesis impurities present in the crude HFSI. In addition, such method(s) can be used to achieve a desired specification for any one of the target impurities. For example, as noted above, with LiFSI the amount of chloride impurities in an LiFSI electrolyte used in a lithium-metal battery can impact the performance and life of the battery. Consequently, a battery designer may set a maximum acceptable level of chloride impurities, such as no greater than 10 ppm or less than 1 ppm. In such and similar cases, purification of the crude HFSI can be performed in a manner that ensures that each desired target impurity meets its specification. This can be done, for example, as described above in connection with FIG. 1.

Once purified, the purified HFSI product can be used to synthesize a purified LiFSI product that has a purity higher than would have been produced using the crude HFSI. Examples of synthesizing a purified LiFSI product of the present disclosure include neutralizing the purified HFSI product with lithium carbonate or lithium hydroxide. As noted in the Background section above, neutralization of HFSI converts impurities in the HFSI into corresponding lithium salt to produce LiF, $FSO_3Li$, LiCl, and $Li_2SO_4$. The respective reactions are as follows:

When the amounts of target HF, FSO$_3$H, HCl, and H$_2$SO$_4$ impurities are reduced using any one or more of the HFSI purification methods disclosed herein, the amounts of the lithium salts formed from those target impurities during neutralization are correspondingly reduced, resulting in a purity higher than could be achieved starting with the crude HFSI.

LiFSI may be synthesized using purified HFSI purified using another synthesis method. For example, this may be accomplished by the reaction of Li metal with purified HFSI, with or without solvent(s), as follows: 2HFSI+2Li=2LiFSI+H$_2$. As another example, purified HFSI may be reacted with lithium hydride, with or without solvent(s), as follows: HFSI+LiH=LiFSI+H$_2$.

Those skilled in the art will readily understand that the foregoing example of synthesizing a purified LiFSI product of the present disclosure is merely exemplary and that similar synthesis techniques can be used to form other purified alkali-metal FSI products. For example, an NaFSI product of this disclosure can be synthesized by neutralizing a purified HFSI product of this disclosure with either sodium carbonate or sodium hydroxide, and KFSI product of this disclosure can be synthesized by neutralizing a purified HFSI product of this disclosure with either potassium carbonate or potassium hydroxide. The corresponding target impurities may be, for example, $M_A$F, FSO$_3$M$_A$, M$_A$Cl, and (M$_A$)$_2$SO$_4$, wherein M$_A$ is any one of Li, Na, K, Rb, Cs.

Example Purified Alkali-Metal FSI Products

Using any of the foregoing purification methodologies, such as any of the single-pass purification methodologies disclosed above or multi-pass methodology 100 of FIG. 1, the resulting purified HFSI products can have exceptionally low levels of target impurities resulting from removal of the target impurities by the purification method. Correspondingly, a purified M$_A$FSI product, purified by virtue of the HFSI used to synthesize the purified M$_A$FSI product being purified in accordance with the present disclosure, will have low levels of corresponding impurities that form from the target impurities, such as M$_A$F, FSO$_3$M$_A$, M$_A$Cl, and (M$_A$)$_2$SO$_4$, wherein M$_A$ is any one of Li, Na, K, Rb, Cs, and Fr. For example, a purified M$_A$FSI product of the present disclosure in which at least one of the target impurities is M$_A$Cl can have an M$_A$Cl level less than or equal to about 10 ppm, or less than 1 ppm. As another example, a purified M$_A$FSI product of the present disclosure in which at least one of the target impurities includes M$_A$F, FSO$_3$M$_A$, and M$_A$Cl can have: M$_A$F less than or equal to about 80 ppm, FSO$_3$M$_A$ less than or equal to about 550 ppm, and M$_A$Cl less than or equal to about 100 ppm; M$_A$F less than or equal to about 40 ppm, FSO$_3$M$_A$ less than or equal to about 250 ppm, and M$_A$Cl less than or equal to about 20 ppm; or M$_A$F less than or equal to about 200 ppm, FSO$_3$M$_A$ less than or equal to about 100 ppm, and M$_A$Cl less than or equal to about 30 ppm. In another example, each of the foregoing levels of impurities and combinations thereof can be achieved starting with a crude HFSI having about 500 ppm or more of HF, about 1000 ppm or more of FSO$_3$H, and/or about 200 ppm or more of HCl. In yet another example, a purified M$_A$FSI product of the present disclosure in which at least one of the target impurities is (M$_A$)$_2$SO$_4$ can have an (M$_A$)$_2$SO$_4$ level less than or equal to about 280 ppm, or less than about 100 ppm. In a further example, each of the foregoing (M$_A$)$_2$SO$_4$ levels can be achieved starting with a crude HFSI having about 500 ppm or more of H$_2$SO$_4$.

Example Uses of Purified Alkali-Metal FSI Products

As mentioned above, a purified M$_A$FSI product may be used to make a purified electrolyte for an electrochemical device, among other things. Here, the purity of the purified electrolyte flows from the fact that the crude HFSI from which the purified M$_A$FSI product is made has been purified in accordance with any one or more of the methods disclosed herein. Such purified electrolytes can be made using any of a variety of methods, such as by mixing a purified M$_A$FSI product (salt) of the present disclosure with one or more solvents, one or more diluents, and/or one or more additives, which solvents, diluents, and additives may be known in the art. As noted above, a purified M$_A$FSI product may be any one of LiFSI, NaFSI, KFSI, RbFSI, CsFSI, and FrFSI so as to make a corresponding one of an LiFSI-based, an NaFSI-based, a KFSI-based, an RbFSI-based, a CsFSI-based, and FrFSI-based electrolyte.

Figure 2:
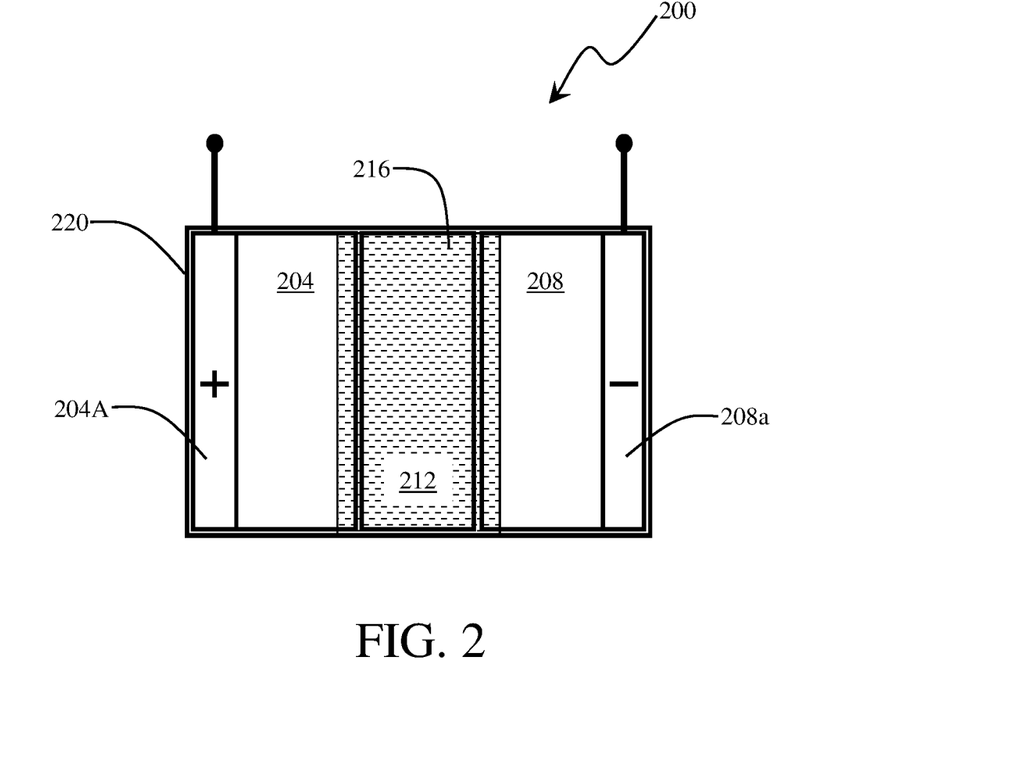
FIG. 2 is a high-level diagram illustrating an electrochemical device made in accordance with aspects of the present disclosure.

FIG. 2 illustrates an electrochemical device 200 made in accordance with aspects of the present disclosure. Those skilled in the art will readily appreciate that the electrochemical device 200 can be, for example, a battery or a supercapacitor. In addition, those skilled in the art will readily understand that FIG. 2 illustrates only some basic functional components of the electrochemical device 200 and that a real-world instantiation of the electrochemical device, such as a secondary battery or a supercapacitor, will typically be embodied using either a wound construction or a stacked construction. Further, those skilled in the art will understand that the electrochemical device 200 will include other components, such as electrical terminals, seal(s), thermal shutdown layer(s), and/or vent(s), among other things, that, for ease of illustration, are not shown in FIG. 2.

In this example, the electrochemical device 200 includes spaced-apart positive and negative electrodes 204, 208, respectively, and a pair of corresponding respective current collectors 204A, 208A. A porous dielectric separator 212 is located between the positive and negative electrodes 204, 208 to electrically separate the positive and negative electrodes but to allow ions of a purified M$_A$FSI electrolyte 216 made in accordance with the present disclosure to flow therethrough. The porous dielectric separator 212 and/or one, the other, or both of the positive and negative electrodes 204, 208 is/are impregnated with the purified M$_A$FSI electrolyte 216. As described above, a benefit of using a purified M$_A$FSI electrolyte of the present disclosure for purified M$_A$FSI electrolyte 216 is that impurities that can be in M$_A$FSI electrolytes, such as synthesis impurities, can be reduced to levels that are acceptable (e.g., meet one or more impurity level specifications) for use in the electrochemical device 200. Examples of purified M$_A$FSI electrolytes products (salts) and example low levels of their various impurities that can be used to make purified M$_A$FSI electrolyte 216 are described above. The electrochemical device 200 includes a container 220 that contains the current collectors 204A, 208A, the positive and negative electrodes 204, 208, the porous dielectric separator 212, and the purified M$_A$FSI electrolyte 216.

As those skilled in the art will understand, depending upon the type and design of the electrochemical device, each of the positive and negative electrodes 204, 208 comprises a suitable material compatible with the alkali-metal ions and other constituents in the purified $M_A$FSI electrolyte 216. Each of the current collectors 204A, 208A may be made of any suitable electrically conducting material, such as copper or aluminum, or any combination thereof. The porous dielectric separator 212 may be made of any suitable porous dielectric material, such as a porous polymer, among others. Various battery and supercapacitor constructions that can be used for constructing the electrochemical device 200 of FIG. 2, are known in the art. If any of such known constructions is used, a novelty of electrochemical device 200 lies in the high purity of the purified $M_A$FSI electrolyte 216 that has not been achieved with conventional methods of making $M_A$FSI salts and corresponding electrolytes.

In one example, the electrochemical device 200 may be made as follows. The purified $M_A$FSI electrolyte 216 may be made starting with a crude HFSI, which is then purified using any one or more of the purification methods described herein to create a purified HFSI product having suitable low levels of one or more target impurities. In an alternative example, the crude HFSI may first be synthesized, such as by any of the synthesis methods described above. This purified HFSI product may then be used to synthesize a purified $M_A$FSI product (salt), which will have correspondingly low levels of impurity as a result of the starting purified HFSI product having low levels of the original target impurities. This purified $M_A$FSI product may then be used to make the purified $M_A$FSI electrolyte 216, for example, by adding one or more solvents, one or more diluents, and/or one or more additives that enhance the performance of the electrochemical device 200. The purified $M_A$FSI electrolyte 216 may then be added to the electrochemical device 200, after which the container 220 may be sealed.

In some aspects, the present disclosure is directed to a method of synthesizing an $M_A$(bis(fluorosulfonyl)imide) ($M_A$FSI) product, wherein $M_A$ is an alkali metal or an alkaline earth metal, the method comprising: purifying a crude HFSI according to any of the purification methods disclosed herein so as to obtain a purified HFSI; and neutralizing the purified HFSI with $M_A$ carbonate or $M_A$ hydroxide under conditions sufficient to form the $M_A$FSI product.

In one or more embodiments of the method, $M_A$ is an alkali metal.

In one or more embodiments of the method, $M_A$ is lithium.

In one or more embodiments of the method, $M_A$ is an alkaline earth metal.

In some aspects, the present disclosure is directed to a method of making an electrochemical device, the method comprising: synthesizing an $M_A$ (bis(fluorosulfonyl)imide) ($M_A$FSI) salt using any one of the $M_A$FSI synthesis methods disclosed herein, wherein $M_A$ is an alkali metal or an alkaline earth metal; formulating an electrolyte using the synthesized salt; providing an electrochemical device structure that includes a positive electrode, a negative electrode spaced from the positive electrode, and a volume that extends between the positive and negative electrodes and, when the electrolyte is present therein allows ions in the electrolyte to move between the positive and negative electrodes; and adding the electrolyte to the volume.

In one or more embodiments of the method, the electrochemical device is an electrochemical battery, and the electrochemical device structure further includes a separator located within the volume.

In one or more embodiments of the method, $M_A$ is lithium.

In one or more embodiments of the method, the electrochemical battery is a lithium-ion battery.

In one or more embodiments of the method, the electrochemical battery is a lithium-metal battery.

In one or more embodiments of the method, the electrochemical devices is a supercapacitor.

In some aspects, the present disclosure is directed to a purified hydrogen bis(fluorosulfonyl)imide (HFSI) product made by a synthesis process, the purified HFSI product comprising: HFSI; one or more impurities that are byproducts of the synthesis process, wherein the one or more impurities includes: HCl present in an amount less than about 100 parts per million (ppm) relative to the purified HFSI product; $FSO_3H$ present in an amount less than about 500 ppm relative to the purified HFSI product; and HF present in an amount less than about 150 ppm relative to the purified HFSI product.

In one or more embodiments of the purified HFSI product, the HCl is present in an amount less than about 10 ppm relative to the purified HFSI product.

In one or more embodiments of the purified HFSI product, the HCl is present in an amount less than 1 ppm relative to the purified HFSI product.

In some aspects, the present disclosure is directed to a purified $M_A$(bis(fluorosulfonyl)imide) ($M_A$FSI) product made by a synthesis process, wherein $M_A$ is an alkali metal or an alkaline earth metal, the purified $M_A$FSI product comprising: $M_A$FSI; one or more impurities that are byproducts of the synthesis process, wherein the one or more impurities includes: $M_A$Cl present in an amount less than about 100 parts per million (ppm) relative to the purified $M_A$FSI product; $FSO_3M_A$ present in an amount less than about 500 ppm relative to the purified $M_A$FSI product; and $M_A$F present in an amount less than about 150 ppm relative to the purified $M_A$FSI product.

In one or more embodiments of the purified $M_A$FSI product, the $M_A$Cl is present in an amount less than about 10 ppm relative to the purified $M_A$FSI product.

In one or more embodiments of the purified $M_A$FSI product, the $M_A$Cl is present in an amount less than 1 ppm relative to the purified $M_A$FSI product.

In one or more embodiments of the purified $M_A$FSI product, $M_A$ is selected from the group consisting of lithium, sodium, and potassium.

In some aspects, the present disclosure is directed to an electrochemical device, comprising: a positive electrode; a negative electrode spaced from the positive electrode; a porous dielectric separator located between the positive and negative electrodes; and an electrolyte contained within at least the porous dielectric separator, the electrolyte made using any of the purified $M_A$FSI products of the present disclosure.

In one or more embodiments of the electrochemical device, the electrochemical device is a lithium-ion battery and includes a porous separator located within the volume, and the $M_A$ is lithium.

In one or more embodiments of the electrochemical device, the electrochemical device is a lithium-metal battery and includes a porous separator located with the volume, and the $M_A$ is lithium.

In one or more embodiments of the electrochemical device, the electrochemical device is a supercapacitor.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

CITED REFERENCES

Each of the following references is incorporated by reference for the relevant subject matter taught as determined from the location herein of the corresponding citation.
[1] Rolf Appel, Gerhard Eisenhauer, Chemische Berichte, 1962, 246-248.
[2] Inorganic Syntheses, 1967, 11, 138-143.
[3] Ref. B. Krumm, A. Vij, R. L. Kirchmeier, J. M. Shreeve, Inorganic Chemistry, 1998, 37, 6295-6303.
[4] U.S. Pat. No. 7,919,629, titled "SULPHONYL-1,2,4-TRIAZOLE SALTS" and issued on Apr. 5, 2011, in the name of Christophe Michot.
[5] U.S. Pat. No. 8,722,005, titled "SYNTHESIS OF HYDROGEN BIS(FLUORO-SULFONYL)IMIDE" and issued on May 13, 2014, in the names of Joseph C. Poshuta, Jerry L. Martin, and Rajendra P. Singh.
[6] U.S. Pat. No. 8,377,406, titled "SYNTHESIS OF BIS(FLUORO-SULFONYL)IMIDE" and issued on Feb. 19, 2013, in the names of Rajendra P. Singh, Joseph C. Poshusta, and Jerry L. Martin.
[7] Martin Beran, Jiri Prihoda, Zdirad Zak, Milos Cernik, Polyhedron, 2006, 25, 1292-1298.
[8] Z. Anorg. Allg. Chem. 2005, 631, 55-59.

What is claimed is:

1. A method of removing one or more target impurities from crude hydrogen bis(fluorosulfonyl)imide (HFSI) containing HFSI and the one or more target impurities so as to create a purified HFSI product, the method comprising:
contacting the crude HFSI with at least one anhydrous organic solvent under inert conditions to create a solution containing the crude HFSI and the one or more target impurities;
causing the solution to have a temperature sufficient to cause the HFSI in the solution to crystallize while the one or more target impurities remain dissolved in a mother liquor of the solution; and
separating the crystallized HFSI from the mother liquor containing the one or more dissolved target impurities;
wherein moisture is substantially excluded throughout each step.

2. The method of claim 1, further comprising washing the crystalized HFSI with at least one anhydrous organic solvent having a temperature of about 10° C. or less.

3. The method of claim 2, wherein the at least one anhydrous organic solvent has a temperature in a range of about 5° C. to about −20° C.

4. The method of claim 2, further comprising flushing the washed crystallized HFSI using an inert gas to remove remnants of the one or more anhydrous organic solvents used to wash the crystallized HFSI.

5. The method of claim 1, wherein causing the solution to have a temperature sufficient to cause the HFSI in the solution to crystallize while the one or more target impurities remain dissolved in a mother liquor of the solution includes cooling the solution.

6. The method of claim 5, wherein cooling the solution includes cooling the solution to a temperature lower than 17° C.

7. The method of claim 5, wherein cooling the solution includes cooling the solution to a temperature in a range of about 15° C. to about −20° C.

8. The method of claim 5, wherein cooling the solution includes cooling the solution to a temperature in a range of about 10° C. to about −10° C.

9. The method of claim 5, wherein cooling the solution includes cooling the solution to a temperature in a range of about 5° C. to about −20° C.

10. The method of claim 1, wherein the one or more target impurities includes at least one target impurity selected from the group consisting of HF, HCl, and HBr.

11. The method of claim 1, wherein the one or more target impurities include fluorosulfonic acid ($FSO_3H$).

12. The method of claim 1, wherein the one or more target impurities include sulfuric acid ($H_2SO_4$).

13. The method of claim 1, wherein the inert conditions are created using nitrogen, argon, or a mixture of nitrogen and argon.

14. The method of claim 1, wherein the at least one solvent is selected from the group consisting of dichloromethane, chloroform, dichloroethane, dimethyl carbonate (DMC), diethyl carbonate (DEC), ethyl methyl carbonate (EMC), propyl methyl carbonate (PMC), fluoroethylene carbonate (FEC), trans butylene carbonate, acetonitrile, malononitrile, adiponitrile, methyl acetate, ethyl acetate, propyl acetate, butyl acetate, methyl propionate (MP), ethyl propionate (EP), methanol, ethanol, propanol, and isopropanol.

15. The method of claim 1, wherein the at least one anhydrous organic solvent is present in the solution in about 15% to about 50% by weight.

16. The method of claim 15, wherein the at least one solvent is selected from the group consisting of dichloromethane, chloroform, dichloroethane, dimethyl carbonate (DMC), diethyl carbonate (DEC), ethyl methyl carbonate (EMC), propyl methyl carbonate (PMC), fluoroethylene carbonate (FEC), trans butylene carbonate, acetonitrile, malononitrile, adiponitrile, methyl acetate, ethyl acetate, propyl acetate, butyl acetate, methyl propionate (MP), ethyl propionate (EP), methanol, ethanol, propanol, and isopropanol.

17. The method of claim 1, further comprising placing the crystalized HFSI in a dry atmosphere within a container that is substantially non-reactive with free fluorine and storing the container at a temperature of less than about 25° C.

18. The method of claim 1, wherein the mother liquor contains HF, fluorosulfonic acid, and HCl from the crude HFSI.

19. The method of claim 18, wherein the mother liquor further contains $H_2SO_4$ from the crude HFSI.

20. The method of claim 1, wherein the one or more target impurities are byproducts of a process of synthesizing the HFSI in the crude HFSI.

21. The method of claim 1, wherein contacting the crude HFSI with at least one anhydrous organic solvent includes adding the at least one anhydrous organic solvent to the crude HFSI just until the crude HFSI becomes fully dissolved in the solution.

22. The method of claim 1, wherein the crystalized HFSI contains 100 parts per million (ppm) or less of HCl.

23. The method of claim 22, wherein the crystalized HFSI contains less than 1 ppm of HCl.

24. The method of claim 1, wherein the crystalized HFSI contains about 500 parts per million (ppm) or less of $FSO_3H$, about 100 ppm or less of HCl, and about 150 ppm or less of HF.

25. The method of claim 24, wherein the crystalized HFSI contains less than 1 parts per million (ppm) of HCl.

26. The method of claim 24, wherein the crystalized HFSI contains 100 ppm or less of $H_2SO_4$.

27. The method of claim 1, further comprising:
A) measuring a concentration of at least one of the one or more impurities in the crystalized HFSI;
B) determining if the concentration of the at least one of the one or more impurities satisfies a desired concentration limit; and
C) if the concentration does not satisfy the desired concentration limit, then performing the method of claim 1 using the crystalized HFSI;
wherein the desired concentration limit is predetermined based on purity required in the specific embodiment.

28. The method of claim 27, further comprising repeating A, B, and C until the concentration satisfies the desired concentration limit.

29. The method of claim 28, wherein:
A includes measuring the concentration of HCl; and
B includes determining if the concentration is less than about 100 parts per million (ppm).

30. The method of claim 29, wherein B includes determining if the concentration is less than 1 ppm.

* * * * *